United States Patent
Muhammad

(10) Patent No.: US 11,761,580 B2
(45) Date of Patent: Sep. 19, 2023

(54) WEARABLE HOLDER FOR A HANDHELD ELECTRONIC DEVICE

(71) Applicant: Kareem Bilal Muhammad, Philadelphia, PA (US)

(72) Inventor: Kareem Bilal Muhammad, Philadelphia, PA (US)

(*) Notice: Subject to any disclaimer, the term of this patent is extended or adjusted under 35 U.S.C. 154(b) by 0 days.

(21) Appl. No.: 17/189,170

(22) Filed: Mar. 1, 2021

(65) Prior Publication Data
US 2021/0180749 A1  Jun. 17, 2021

(51) Int. Cl.
*F16M 13/04* (2006.01)
*H04B 1/3888* (2015.01)

(52) U.S. Cl.
CPC .......... *F16M 13/04* (2013.01); *H04B 1/3888* (2013.01)

(58) Field of Classification Search
CPC ....... Y10S 224/93; F16M 13/04; A41F 1/008; A41F 9/02
USPC .......................................... 224/930
See application file for complete search history.

(56) References Cited

U.S. PATENT DOCUMENTS

| | | | | |
|---|---|---|---|---|
| 775,149 A * | 11/1904 | Righton | .................... | A45F 5/02 224/195 |
| 3,004,519 A * | 10/1961 | Weissman | ............ | A47D 15/006 182/4 |
| 5,152,443 A * | 10/1992 | Hagan | ....................... | A45F 5/02 224/904 |
| 8,471,398 B2 * | 6/2013 | Leijon | .................. | H02K 7/1876 384/7 |
| 9,376,002 B2 * | 6/2016 | Bennett | ..................... | B60J 7/061 |
| 9,629,398 B2 * | 4/2017 | Goryl | ....................... | A45F 3/047 |
| 9,750,332 B2 * | 9/2017 | Botticello | ............... | A45F 5/021 |
| 10,513,227 B2 * | 12/2019 | Merino | ..................... | B60R 9/10 |
| 10,883,649 B2 * | 1/2021 | Sautter | ................. | F16M 11/046 |
| 11,040,639 B2 * | 6/2021 | Condamin | .............. | B60N 2/20 |
| 2021/0386186 A1 * | 12/2021 | Sullivan | .................. | A45F 5/021 |

* cited by examiner

*Primary Examiner* — Adam J Waggenspack
(74) *Attorney, Agent, or Firm* — Barry Choobin; Patent 360

(57) ABSTRACT

A holder for handheld electronic devices, such as a smartphone. The holder includes a hoop body configured to be worn around a waist of a person. The hoop body having a proximal end and a distal end, wherein the proximal end and the distal end having a quick release lock to couple to the proximal end to the distal end. The hoop body having a tunnel configured around its outer periphery. A runner connected to a bracket through a semi-rigid extension. The runner, slidably received in the tunnel, can revolve along its length. The bracket can mount the handheld electronic device.

5 Claims, 1 Drawing Sheet

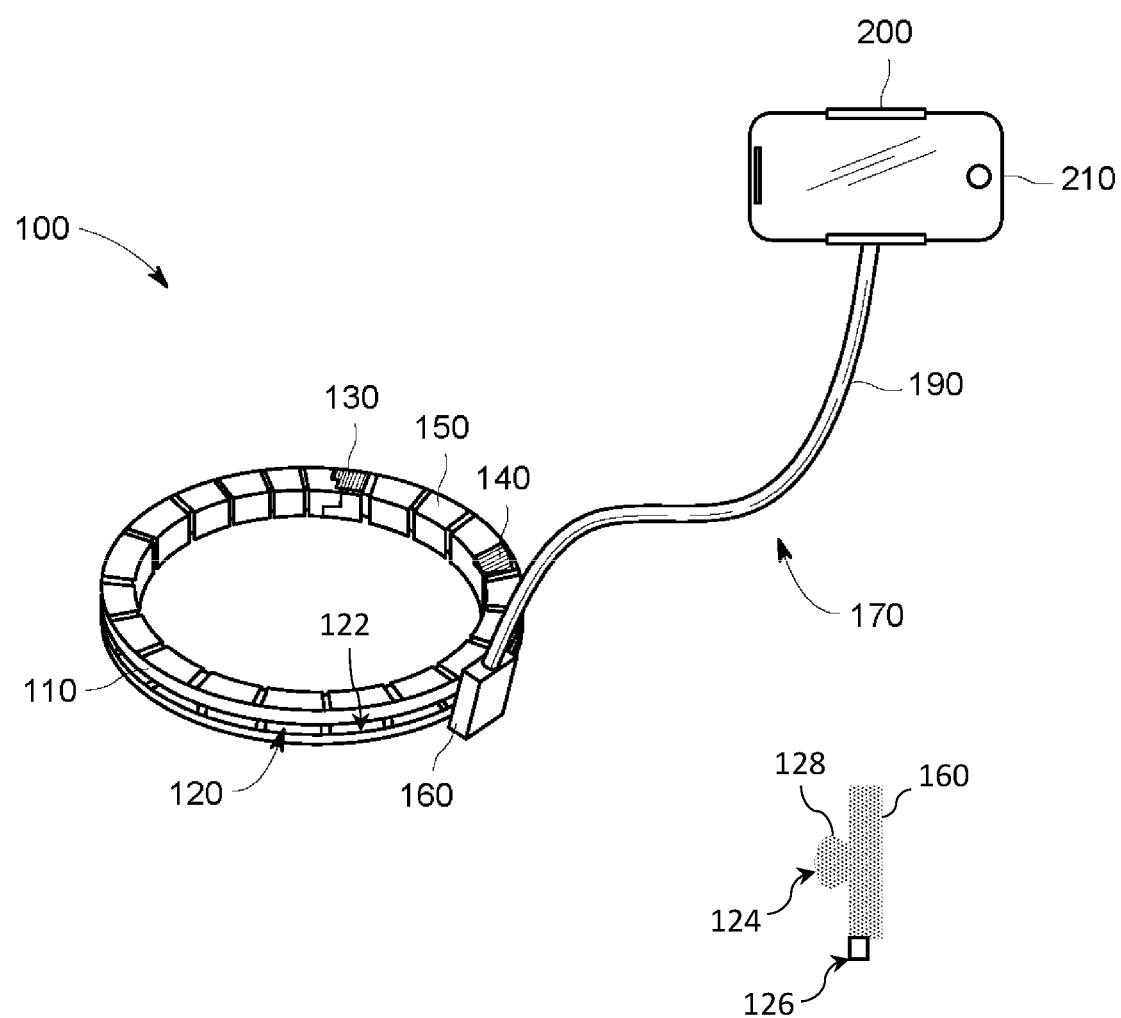

WEARABLE HOLDER FOR A HANDHELD ELECTRONIC DEVICE

FIELD OF INVENTION

The present invention relates to a holder for a handheld electronic device, and more particularly, the present invention relates to a holder that can be worn on a waist for hands-free holding the electronic device.

BACKGROUND

Today mobile phones have become an essential part of life. Phones are used not only for calling but for entertainment, work, managing daily errands, and lots more. People watch videos, have video conferences, play games, and a lot more on their smartphones. Also, people now read articles, news, books, and like on their smartphone. For all such tasks, users must hold the phone in their hand and front of the face (line-of-sight). Holding the phone in front of eyes for a long duration can be distressing and may also cause pain in the arms and shoulder.

A user can keep the smartphone on a table or stand, but in such a case, the viewing angles may not be proper and so, the user has to position their neck in an odd posture, which may cause neck injury. Also, the bodily movements become confined relative to the stationary phone. Continuing in the same posture for long durations, and maybe in an odd posture, can be unhealthy and tiresome.

Thus, a need is appreciated for a holder that allows hands-free operation of a handheld electronic device such as a smartphone. Moreover, a need is appreciated for the holder that does not affect the mobility of a user.

SUMMARY OF THE INVENTION

The following presents a simplified summary of one or more embodiments of the present invention in order to provide a basic understanding of such embodiments. This summary is not an extensive overview of all contemplated embodiments and is intended to neither identify key or critical elements of all embodiments nor delineate the scope of any or all embodiments. Its sole purpose is to present some concepts of one or more embodiments in a simplified form as a prelude to the more detailed description that is presented later.

The principal object of the present invention is therefore directed to a holder that allows hands-free operation of a handheld electronic device.

It is another object of the present invention that the holder does not limit the mobility of a user.

It is still another object of the present invention that the holder allows 360 degrees adjustment in the positioning of the electronic device.

It is yet another object of the present invention that the holder is economical to manufacture.

It is an additional object of the present invention that the holder allows positioning the electronic device in the line of sight.

It is still an additional object of the present invention that the holder is easy to use.

In one aspect, disclosed is a holder for handheld electronic devices, such as a smartphone. The holder includes a hoop body configured to be worn around the waist of a person. The hoop body having a proximal end and a distal end, wherein the proximal end and the distal end having a quick release lock to couple to the proximal end to the distal end. The hoop body having a tunnel configured around the outer perimeter of the hoop body. A bracket member having an elongated semi-rigid cord having a runner at one end and a bracket at the other end. The runner can slidably receive in the tunnel and revolve along its length. The bracket can mount the handheld electronic device.

These and other objects and advantages of the embodiments herein will become readily apparent from the following detailed description taken in conjunction with the accompanying drawings.

BRIEF DESCRIPTION OF DRAWINGS

The accompanying figures, which are incorporated herein, form part of the specification and illustrate embodiments of the present invention. Together with the description, the figures further explain the principles of the present invention and to enable a person skilled in the relevant arts to make and use the invention.

FIG. 1 shows the holder, according to an exemplary embodiment of the present invention.

DESCRIPTION OF THE INVENTION

Subject matter will now be described more fully hereinafter with reference to the accompanying drawings, which form a part hereof, and which show, by way of illustration, specific exemplary embodiments. Subject matter may, however, be embodied in a variety of different forms and, therefore, covered or claimed subject matter is intended to be construed as not being limited to any exemplary embodiments set forth herein; exemplary embodiments are provided merely to be illustrative. Likewise, a reasonably broad scope for claimed or covered subject matter is intended. Among other things, for example, the subject matter may be embodied as methods, devices, components, or systems. The following detailed description is, therefore, not intended to be taken in a limiting sense.

The word "exemplary" is used herein to mean "serving as an example, instance, or illustration." Any embodiment described herein as "exemplary" is not necessarily to be construed as preferred or advantageous over other embodiments. Likewise, the term "embodiments of the present invention" does not require that all embodiments of the invention include the discussed feature, advantage, or mode of operation.

The terminology used herein is for the purpose of describing particular embodiments only and is not intended to be limiting of embodiments of the invention. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

The following detailed description includes the best currently contemplated mode or modes of carrying out exemplary embodiments of the invention. The description is not to be taken in a limiting sense but is made merely for the purpose of illustrating the general principles of the invention, since the scope of the invention will be best defined by the allowed claims of any resulting patent.

Disclosed is a holder that allows hands-free operation of a handheld electronic device, such as a smartphone. The holder does not limit the mobility of a user while the holder allows 360 degrees adjustment in the positioning of the electronic device. The holder allows positioning the electronic device in the line-of-sight of a user.

Referring to FIG. 1, which shows an exemplary embodiment of the holder 100 having a hoop body 110 which is configured to be worn around a waist of a person. The hoop body 110 having a proximal end and a distal end, wherein the proximal end having a quick release lock 130 and the distal end having the second quick release lock 140. The two quick-release locks can be a part of a fastener that permits the proximal end to be coupled to the distal end. The hoop body 110 can be flexible enough to permit pulling away of the proximal end and the distal end away from each other, such as to wear the hoop body around the waist of the user. FIG. 1 also shows a section 150 that extends between the proximal end and the distal end. Such sections of different lengths can be used to vary the size of the hoop body, wherein the quick-release locks at the proximal end and the distal end can lock to the two ends of section member 150.

FIG. 1 also shows a tunnel 120 that extends along the outer periphery and between the proximal end and the distal end of the hoop body 110. Section 150 can also have a similar tunnel that is continuous with the tunnel 120 of the hope body 110 to form a continuous and infinite tunnel.

FIG. 1 also shows a bracket 170 that is having a runner 160 that can be slidably received into the tunnel 120 of the hoop body. The runner 160 revolves along the tunnel around the waist of a user wearing the holder. A semi-rigid cord 190 extends between the bracket 200 and the runner 160. The semi-rigid cord 190 can be adjusted by bending the cord using force, wherein the semi-rigid cord 190 can retain the shape. The bracket 200 can mount a portable or handheld electronic device, such as a smartphone. In one case, the bracket can be replaced by another bracket that can mount a different electronic device. FIG. 1 shows a smartphone 210 mounted in bracket 200.

In one exemplary embodiment, the inner surface of the tunnel of the hoop body has a layer of soft material 122 or the outer surface of the runner 160 can have a layer of soft material 124 that increases the stability of the runner 160 relative to the hoop body. Additionally, the soft material can provide a dampening effect for reducing the vibrations. The soft member can be rubber or silicon. The runner can also be provided with a locking mechanism 126 that locks the runner to the hoop member, preventing sliding of the runner. It is understood that the specific position of the locking mechanism shown in FIG. 1 is for illustration only and the position of the locking mechanism can vary without departing from the scope of the present invention. A user can wear the disclosed holder around his waist and position the bracket in the desired position, such as in line-of-sight for viewing the display. In one case, the runner can slide to the desired position on the hop body, such as in front of a user or the side of the user. Thereafter the cord of the holder can be adjusted for the desired position of the bracket.

In one case, the runner can be rotated in the tunnel electronically. For example, the runner having motorized wheels that runs in the tunnel. A control button can be provided in the holder for driving the runner. The motorized runner can also be operated wirelessly through a smartphone.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above-described embodiment, method, and examples, but by all embodiments and methods within the scope and spirit of the invention as claimed.

What is claimed is:

1. A holder for a handheld electronic device comprising:
   a hoop body configured to be worn around a waist of a person, the hoop body has a proximal end and a distal end, a tunnel configured along an outer upper and lower periphery of the hoop body between a proximal end and a distal end, the proximal end and the distal end comprises a quick release lock configured to secure the proximal end to the distal end resulting in a continuous infinite tunnel; and
   a bracket member comprises a semi-rigid cord, the semi-rigid cord has a proximal end and a distal end, the proximal end of the semi-rigid cord has a runner and the distal end of the semirigid cord has a bracket, the runner slidably mounted into the tunnel, the bracket configured to mount the handheld electronic device,
   wherein the holder further comprises a first section member and a second section member, each of the first section member and the second section member having two opposite ends configured to be respectively coupled to the proximal end and the distal end through the quick release lock so as to extend between the proximal end and the distal end for increasing a diameter of the holder, wherein each of the first section member and the second section member has a tunnel which is continuous with the tunnel of the hoop body, wherein a length of the first section member is lesser than a length of the second section member.

2. The holder according to claim 1, wherein an inner surface of the tunnel has a layer of soft material, the soft material configured to dampen vibrations.

3. The holder according to claim 1, wherein an outer surface of the runner has a layer of soft material, the soft material configured to dampen vibrations.

4. The holder according to claim 1, wherein the handheld electronic device is a smartphone.

5. The holder according to claim 1, wherein the runner has a locking mechanism for restricting the sliding of the runner.

* * * * *